United States Patent
Kameda et al.

(10) Patent No.: US 8,116,033 B2
(45) Date of Patent: Feb. 14, 2012

(54) THIN-FILM MAGNETIC HEAD WITH MAIN MAGNETIC POLE LAYER AND AUXILIARY YOKE LAYER FLARE CONFIGURATIONS

(75) Inventors: Hiroshi Kameda, Tokyo (JP); Hisayuki Yazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 705 days.

(21) Appl. No.: 12/126,519

(22) Filed: May 23, 2008

(65) Prior Publication Data
US 2008/0297952 A1  Dec. 4, 2008

(30) Foreign Application Priority Data
May 29, 2007 (JP) ................ P2007-142233

(51) Int. Cl.
*G11B 5/31* (2006.01)
(52) U.S. Cl. .................. 360/125.1; 360/125.14
(58) Field of Classification Search ........... 360/125.09, 360/125.1, 125.11, 125.12, 125.13, 125.14, 360/125.15
See application file for complete search history.

(56) References Cited

U.S. PATENT DOCUMENTS
5,805,391 A * 9/1998 Chang et al. ............ 360/317
2006/0250712 A1 11/2006 Matono et al.

FOREIGN PATENT DOCUMENTS
JP  A-2006-155867  6/2006

* cited by examiner

*Primary Examiner* — Craig A. Renner
*Assistant Examiner* — Gustavo Polo
(74) *Attorney, Agent, or Firm* — Oliff & Berridge, PLC (57) ABSTRACT

To provide a thin-film magnetic head which suppresses PE while securing magnetic recording capability by controlling a domain of a leading end part of a main magnetic pole layer. The first flare part has a first flare angle smaller than a second flare angle of the second flare part. The second flare angle is smaller than 90°. The auxiliary yoke layer has a flare angle not smaller than the first flare angle but not greater than the second flare angle. The length h from the medium-opposing surface of the pole straight part to the end on the deeper side in the height direction of the first flare part satisfies the following conditional expression: h×Bs<0.000008 [m·T] where Bs is the saturated magnetic flux density of the main magnetic pole layer.

2 Claims, 7 Drawing Sheets

Related Art

THIN-FILM MAGNETIC HEAD WITH MAIN MAGNETIC POLE LAYER AND AUXILIARY YOKE LAYER FLARE CONFIGURATIONS

BACKGROUND OF THE INVENTION

1. Field of the Invention

The present invention relates to a thin-film magnetic head which performs a recording action by supplying a magnetic field to a recording medium.

2. Related Background Art

As is well known, a conventional thin-film magnetic head such as a perpendicular magnetic recording head, for example, has a main magnetic pole layer and a return path layer which are laminated with a nonmagnetic layer interposed therebetween on a surface opposing a recording medium, and a coil layer which supplies a recording magnetic field to the main magnetic pole layer and return path layer. The main magnetic pole layer exposed at the medium-opposing surface has an area sufficiently smaller than that of the return path layer, while the main magnetic pole layer and return path layer are magnetically coupled to each other on the deeper side in the height direction. For making it possible to locally apply a strong recording magnetic field to the recording medium, the main magnetic pole layer has a pole straight part exposed at the medium-opposing surface and a flare part in contact with the pole straight part on the deeper side in the height direction. When the coil layer is energized, the recording magnetic field is induced between the main magnetic pole layer and return path layer, perpendicularly enters a hard film of the recording medium from a leading end face of the main magnetic pole layer exposed at the medium-opposing surface, and returns to the return path layer through a soft film of the recording medium. This performs magnetic recording at a part opposing the main magnetic pole layer.

When the main magnetic pole layer to become a yoke has such a domain structure as to yield a greater magnetization component in the height direction in the thin-film magnetic head, the yoke domain is transferred to the main magnetic pole layer leading end, whereby the remanent magnetization in the magnetic pole increases. In the thin-film magnetic head, the magnetization is narrowed by the yoke form of the main magnetic pole layer. For narrowing the magnetization, the flare angle of 45° in the flare part has been considered the most efficient. Therefore, the flare angle of the flare part has conventionally been determined within a typical range of 15° to 45° with side fringes in mind. When the flare part has two stages, the flare angle in the second stage has been made wider (greater) than that in the first stage, so as to regulate the narrowing of magnetization.

Figure 7:
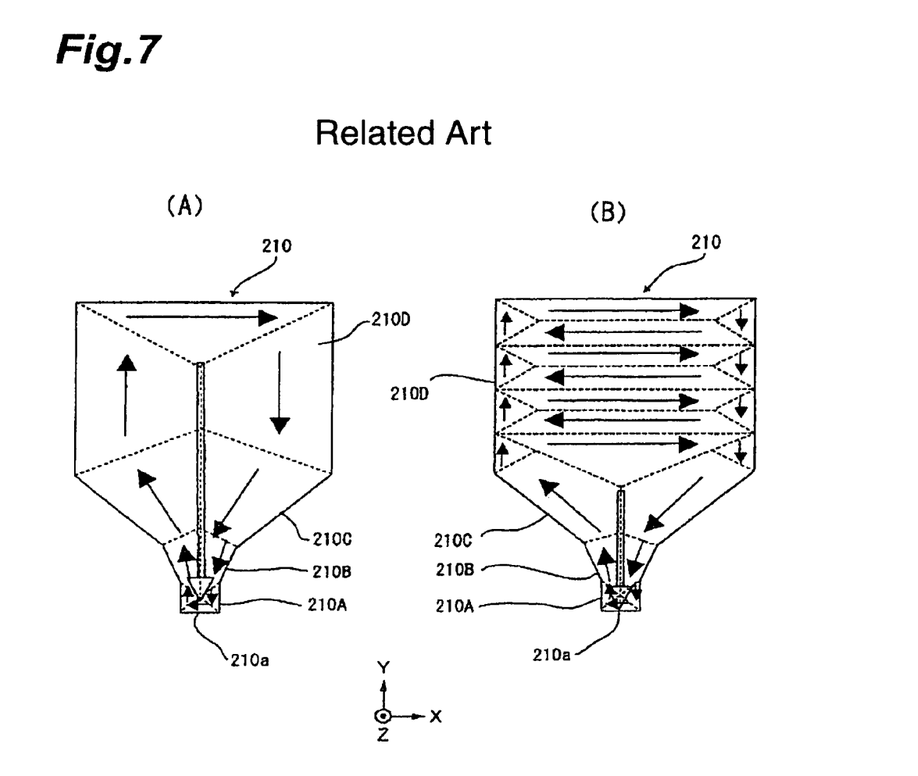

(A) and (B) of FIG. 7 are views showing a main magnetic pole layer 210 having a first flare part 210B and a second flare part 210C, which are conventional two-stage flare parts, as seen two-dimensionally. In these drawings, X, X, and Z directions are defined by the track width direction, the height direction, and the laminating direction of layers constituting a thin-film magnetic head or the moving direction of a recording medium, respectively. The first flare part 210B subsequent to the pole straight part 210A has a flare angle of 20° to 45°. When a base part 210D acting as a yoke part becomes a closure domain as in (A) of FIG. 7, a strong magnetic field is applied to a magnetic pole leading end 210a, since the base part 210D has a large magnetization component in the height direction, whereby strong PE (pole erasure) occurs. When the base part 210D becomes a laterally striped domain as shown in (B) of FIG. 7, on the other hand, the magnetization component in the height direction of the domain of the yoke part is small, so that the magnetic field applied to the magnetic pole leading end 210a becomes weak, thereby lowering PE. When the yoke form/magnetic anisotropy is uncontrolled as such, the effective magnetization (illustrated by whitened arrows) additionally applied to the magnetic pole leading end 210a varies greatly, whereby the occurrence of PE cannot be suppressed.

Therefore, it has conventionally been proposed to widen the main magnetic pole layer in the track width direction, e.g., set the ratio of width/length in the height direction to 1 or greater, so as to control the domain structure (Japanese Patent Application Laid-Open No. 2006-155867).

SUMMARY OF THE INVENTION

In the conventional example, however, the flare angle of the second flare part connected to the first flare part is set to 90°, whereby no second flare part substantially exists. Also, no auxiliary yoke layer (auxiliary magnetic pole layer) has been taken into consideration. Setting the flare angle of the second flare part to 90° and widening the base part as in the conventional example has been problematic in that magnetic fluxes cannot efficiently be narrowed to the leading end part of the main magnetic pole, which lowers magnetic recording capability.

In view of the conventional problem mentioned above, it is an object of the present invention to provide a thin-film magnetic head which suppresses the PE while securing the magnetic recording capability by controlling the domain of the leading end part of the main magnetic pole layer.

For overcoming the problem, the present invention provides a thin-film magnetic head comprising a main magnetic pole layer having a pole straight part exposed at a surface opposing a recording medium, a flare part widening in a track width direction from the pole straight part to the deeper side in a height direction, and a base part connecting with an end on the deeper side in the height direction of the flare part; and an auxiliary yoke layer having a flare part widening in the track width direction from the medium-opposing surface side to the deeper side in the height direction and a base part connecting with an end on the deeper side in the height direction of the flare part, the auxiliary yoke layer overlapping the main magnetic pole layer when seen two-dimensionally and magnetically connecting with the main magnetic pole layer; wherein the flare part of the main magnetic pole layer has at least first and second flare parts successively from the pole straight part to the deeper side in the height direction, the first and second flare parts having such a form as to narrow a magnetic flux stepwise from the base part to the pole straight part; wherein the first flare part has a first flare angle smaller than a second flare angle of the second flare part, the second flare angle being smaller than 90°, the auxiliary yoke layer having a flare angle not smaller than the first flare angle but not greater than the second flare angle; and wherein the length h from the medium-opposing surface of the pole straight part to the end on the deeper side in the height direction of the first flare part satisfies the following conditional expression:

$$h \times Bs < 0.000008 \, [m \cdot T]$$

where Bs is the saturated magnetic flux density of the main magnetic pole layer.

Since a laterally striped domain is formed in the base part while the flare part converges magnetic fluxes stepwise in the present invention, the effective magnetization additionally applied to the leading end of the pole straight part becomes weaker, whereby the PE is suppressed.

The present invention will be more fully understood from the detailed description given here in below and the accompanying drawings which are given by way of illustration only, and thus are not to be considered as limiting the present invention.

BRIEF DESCRIPTION OF THE DRAWINGS

(A) and (B) of FIG. 4 are views, showing the main magnetic pole layer as seen two-dimensionally, for explaining domain structures of the main magnetic pole layer in the thin-film magnetic head.

(A) to (E) of FIG. 5 are views showing the main magnetic pole layer and auxiliary yoke layer in examples and comparative examples of the thin-film magnetic head in which the first flare part of the main magnetic pole layer has different lengths.

DESCRIPTION OF THE PREFERRED EMBODIMENTS

The present invention will now be explained with reference to the accompanying drawings. In each drawing, X, Y, and Z directions are defined as the track width direction, the height direction, and the laminating direction of layers constituting a thin-film magnetic head MH or the moving direction of a recording medium M, respectively.

Figure 1:
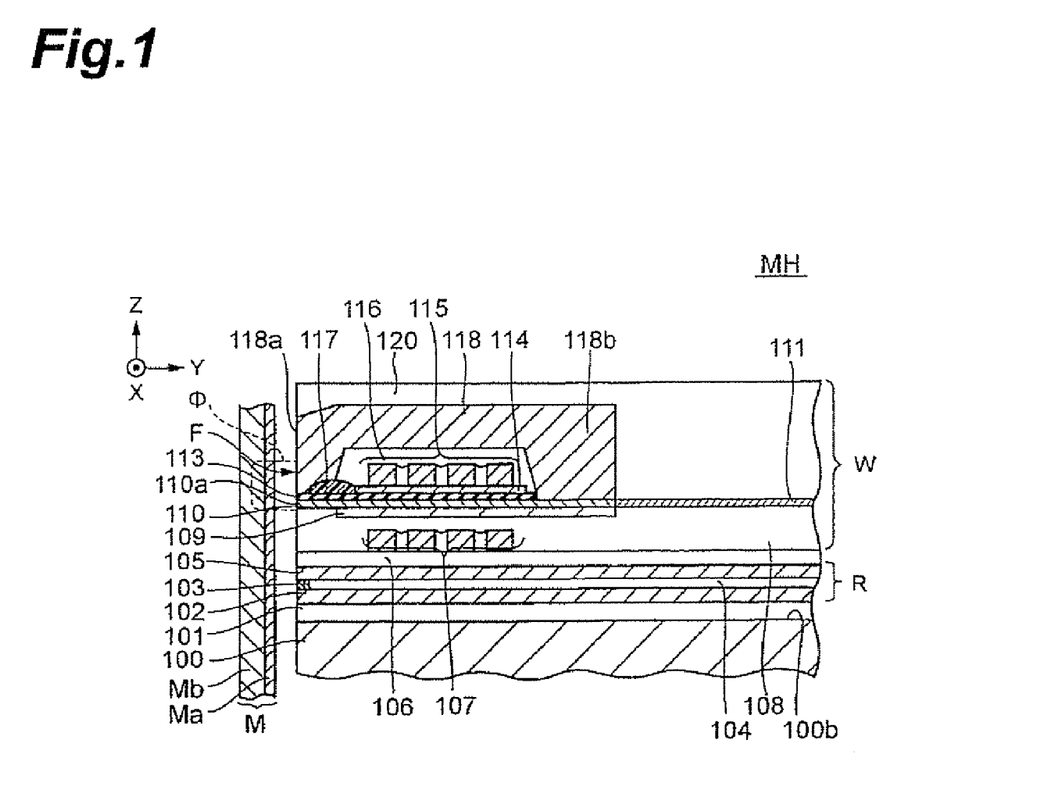
FIG. 1 is a partial sectional view showing the lamination structure of the thin-film magnetic head in accordance with an embodiment of the present invention as seen in the track width direction.

FIG. 1 is a partial sectional view showing the lamination structure of the thin-film magnetic head MH in accordance with an embodiment of the present invention as seen in the track width direction. The thin-film magnetic head MH has a reading part R and a recording part W which are formed by laminating thin films at a cross section on the trailing side of a slider 100, and performs a recording action by providing the recording medium M with a perpendicular magnetic field Φ so as to perpendicularly magnetize a hard film Ma of the recording medium M. The recording medium M has the hard film Ma with a higher remnant magnetization on the medium surface side and a soft film Mb with a higher magnetic permeability on the inner side of the hard film Ma. The recording medium M is shaped like a circular disk, for example, and rotated about the center of the circle as a rotary axis by a spindle motor. The slider 100 is formed by a nonmagnetic material such as $Al_2O_3.TiC$. The slider 100 has a surface F opposing the recording medium M. As the recording medium M rotates, a surface airflow levitates the slider 100 from the surface of the recording medium M.

The trailing-side end face 100b of the slider 100 is formed with a nonmagnetic insulating layer 101 made of an inorganic material such as $Al_2O_3$ or $SiO_2$. The reading part R is formed on the nonmagnetic insulating layer 101. The reading part R has a lower shield layer 102, an upper shield layer 105, an inorganic insulating layer (gap insulating layer) 104 filling the gap between the lower and upper shield layers 102, 105, and a reading device 103 positioned within the inorganic insulating layer 104. The reading device 103 is a magnetoresistive device such as AMR, GMR, or TMR.

By way of a coil insulating foundation layer 106, a lower coil 107 made of a conductive material is formed on the upper shield layer 105. The lower coil 107 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A nonmagnetic insulating layer 108 is formed about the lower coil 107.

Formed on the nonmagnetic insulating layer 108 are a main magnetic pole layer 110 and an auxiliary yoke layer 109 which overlaps the main magnetic pole layer 110 when seen two-dimensionally and is magnetically coupled to the main magnetic pole layer 110. The auxiliary yoke layer 109 is made of a magnetic material having a saturated magnetic flux density lower than that of the main magnetic pole layer 110 and magnetically connects with the main magnetic pole layer 110, so as to function to guide magnetic fluxes to the main magnetic pole layer 110. On the flattened auxiliary yoke layer 109 and nonmagnetic insulating layer 108, the main magnetic pole layer 110 is formed by a ferromagnetic material having a high saturated magnetic flux density such as Ni—Fe, Co—Fe, or Ni—Fe—Co by way of a plating foundation layer. An insulating material layer 111 is formed about the main magnetic pole layer 110. A magnetic gap layer 113 which is a nonmagnetic layer is formed on the main magnetic pole layer 110. The insulating material layer 111 and magnetic gap layer 113 are made of a nonmagnetic insulating material such as $Al_2O_3$, $SiO_2$, or Al—Si—O, for example. Though the auxiliary layer 109 is placed under the main magnetic pole layer 110 in this embodiment, it may be arranged on the main magnetic pole layer 110.

An upper coil 115 is formed on the magnetic gap layer 113 while interposing a coil insulating foundation layer 114 therebetween. As with the lower coil 107, the upper coil 115 is formed by a plurality of lines made of a conductive material. The upper coil 115 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated.

The lower coil 107 and upper coil 115 have undepicted end parts in the depicted X direction (track width direction) electrically connected to each other so as to yield a solenoid form and are wound about the main magnetic pole layer 110 or auxiliary yoke layer 109. The form of coil layers (magnetic field generating means) may be spiral, for example, without being restricted to the solenoid in particular.

A nonmagnetic insulating layer 116 is formed about the upper coil 115. A return path layer (auxiliary magnetic pole layer) 118 is formed over the nonmagnetic insulating layer 116 and magnetic gap layer 113 by a ferromagnetic material such as permalloy. The return path layer 118 has a leading end face 118a exposed at the opposing surface F and opposes the main magnetic pole layer 110 with a gap therebetween on the opposing surface F. The end part on the deeper side in the height direction of the return path layer 118 is a connecting part 118b connected to the main magnetic pole layer 110. A throat determining layer 117 is formed by an inorganic or organic material at a position separated from the opposing surface F by a predetermined distance on the magnetic gap layer 113. The throat height of the thin-film magnetic head MH is defined by the distance from the opposing surface F to the front end edge of the throat height determining layer 117. The return path layer 118 is covered with a protective layer 119 made of a nonmagnetic insulating material.

This thin-film magnetic head MH is characterized by the main magnetic pole layer 110 and auxiliary yoke layer 109. Forms, arrangements, and the like of the main magnetic pole layer 110 and auxiliary yoke layer 109 will now be explained with reference to FIGS. 2 and 3.

Figure 2:
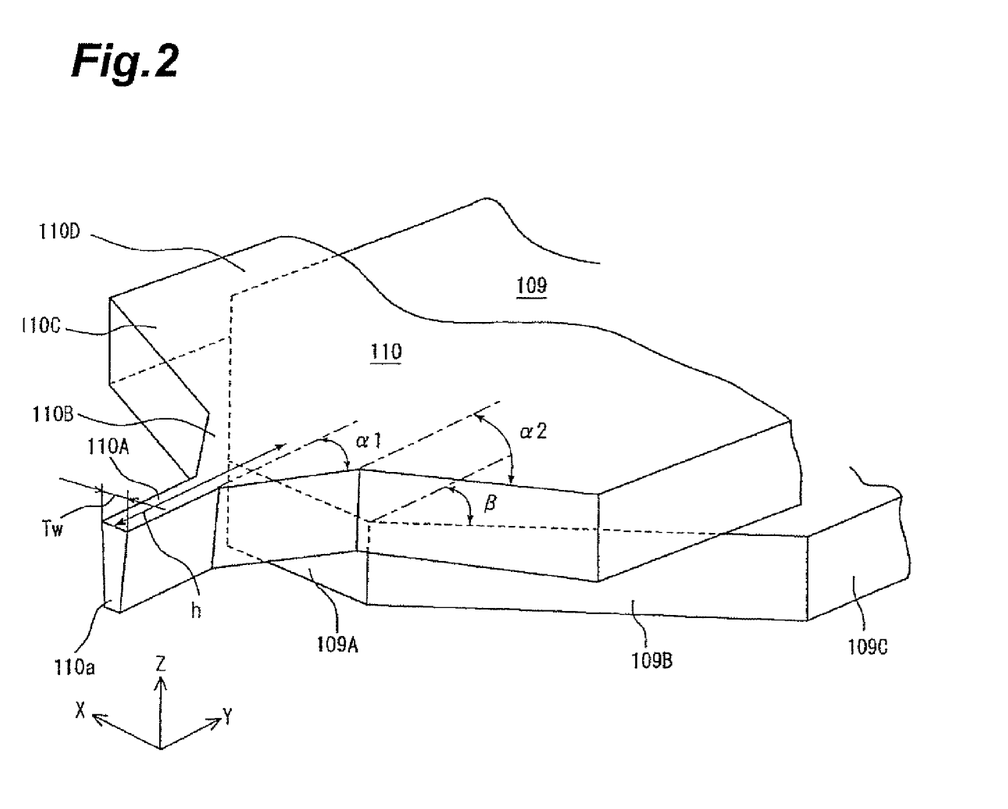
FIG. 2 is a perspective view showing the main magnetic pole layer and auxiliary yoke layer in the thin-film magnetic head of FIG. 1.

As shown in FIG. 2, the main magnetic pole layer 110 has a pole straight part 110A, a first flare part 110B, a second flare part 110C, and a base part 110D successively from the surface F opposing the recording medium M. The second flare part 110C, which is a flare part at the last stage, is an area for adjusting a domain structure generated in the base part 110D upon excitation such that it is oriented in the track width direction. The first flare part 110B is an area for narrowing a recording magnetic field from the base part 110D through the second flare part 110C to the pole straight part 110A. The first flare part 110B increases its size in the track width direction by a first flare angle $\alpha 1$ from the pole straight part 110A to the deeper side in the height direction, so as to connect with the second flare part 110C. The second flare part 110C increases its size in the track width direction by a second flare angle $\alpha 2$ from the first flare part 110B to the deeper side in the height direction (the base part 110D), so as to connect with the base part 110D. Here, $\alpha 1 < \alpha 2$.

Figure 3:
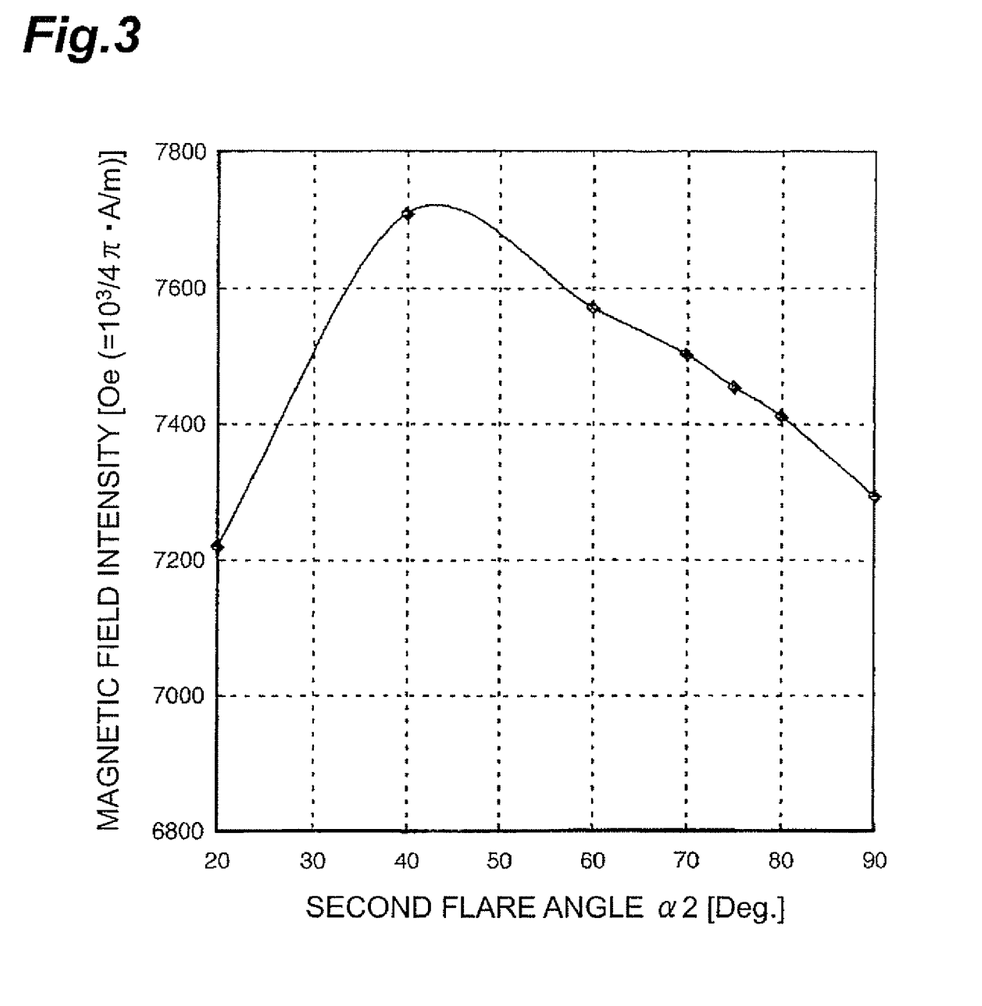
FIG. 3 is a graph showing the relationship between the second flare angle in the main magnetic pole layer of the thin-film magnetic head and the magnetic field intensity.

The second flare angle $\alpha 2$ smaller than 90° can increase magnetic field intensity as shown in FIG. 3, whereas pole erasure (PE) occurs when the second flare angle $\alpha 2$ is less than 60°. Therefore, for securing recording capability, the second flare angle $\alpha 2$ is preferably 60° to 80°, more preferably 60° to 70°. In FIG. 3, the abscissa and ordinate indicate the second flare angle $\alpha 2$ [deg] and magnetic field intensity [Oe (=$10^3/4\pi \cdot A/m$)], respectively.

The pole straight part 110A constitutes the main magnetic pole leading end 110a exposed at the surface F opposing the recording medium M. The sizes of the pole straight part 110A in the track width direction and height direction are defined by a predetermined writing track width Tw and a predetermined neck height Nh, respectively. The pole straight part 110A uniformly yields a trapezoidal (bevel) cross-sectional form which is narrower on the nonmagnetic insulating layer 108 side throughout its length when seen from the surface F opposing the recording medium M. Beveling the pole straight part 110A can make the writing track width Tw smaller than that in the case of a rectangular cross section (no beveling) when a skew angle is provided.

The first flare part 110B has a trapezoidal cross-sectional form which is narrower on the nonmagnetic insulating layer 108 side when seen from the surface F opposing the recording medium M. The trapezoidal form of the first flare part 110B matches the cross-sectional form of the pole straight part 110A at the junction therewith, and gradually deforms from the pole straight part 110A to the deeper side in the height direction such that the ratio in length of the longer base to shorter base of the trapezoid approaches 1, so as to connect with the second flare part 110C. The cross-sectional form of the second flare part 110C at the junction with the base part 110D matches the cross-sectional form of the base part 110D and exhibits a rectangular form (the state where the ratio in length of the longer base to the shorter base equals 1). Thus widening the size in the track width direction from the first flare part 110B to the base part 110D can appropriately control the domain. This yields a main magnetic pole structure which can suppress the PE by domain control.

The auxiliary yoke layer 109 has a leading end part 109A which is the front-side end in the height direction and a flare part 109B. The leading end part 109 A overlaps the second flare part 110C. The flare part 109B widens the size in the track width direction by a flare angle $\beta$ from the leading end part 109A to the rear side in the height direction. The end part on the rear side in the height direction of the flare part 109B is connected to a base part (yoke part) 109C. Preferably, the flare angle $\beta$ of the auxiliary yoke layer 109 is not greater than the second flare angle $\alpha 2$. In this embodiment, $\alpha 1=40°$, $\alpha 2=\beta=70°$. Preferably, the width of the base part 109C of the auxiliary yoke layer 109 is wider than that of the base part 110D of the main magnetic pole layer 110.

The flare part 109B of the auxiliary yoke layer 109 and the first and second flare parts 110B, 110C of the main magnetic pole layer 110 are formed bilaterally symmetric about the center line in the track width direction when seen from the trailing and leading sides.

Examples of the domain structure occurring in the main magnetic pole layer 110 in this embodiment will now be explained with reference to (A) and (B) of FIG. 4. In the drawings, broken lines illustrate boundaries of domains (domain walls), while arrows within the domains indicate magnetization components. Whitened arrows show effective magnetization components added to the main magnetic pole leading end 110a.

Figure 4:
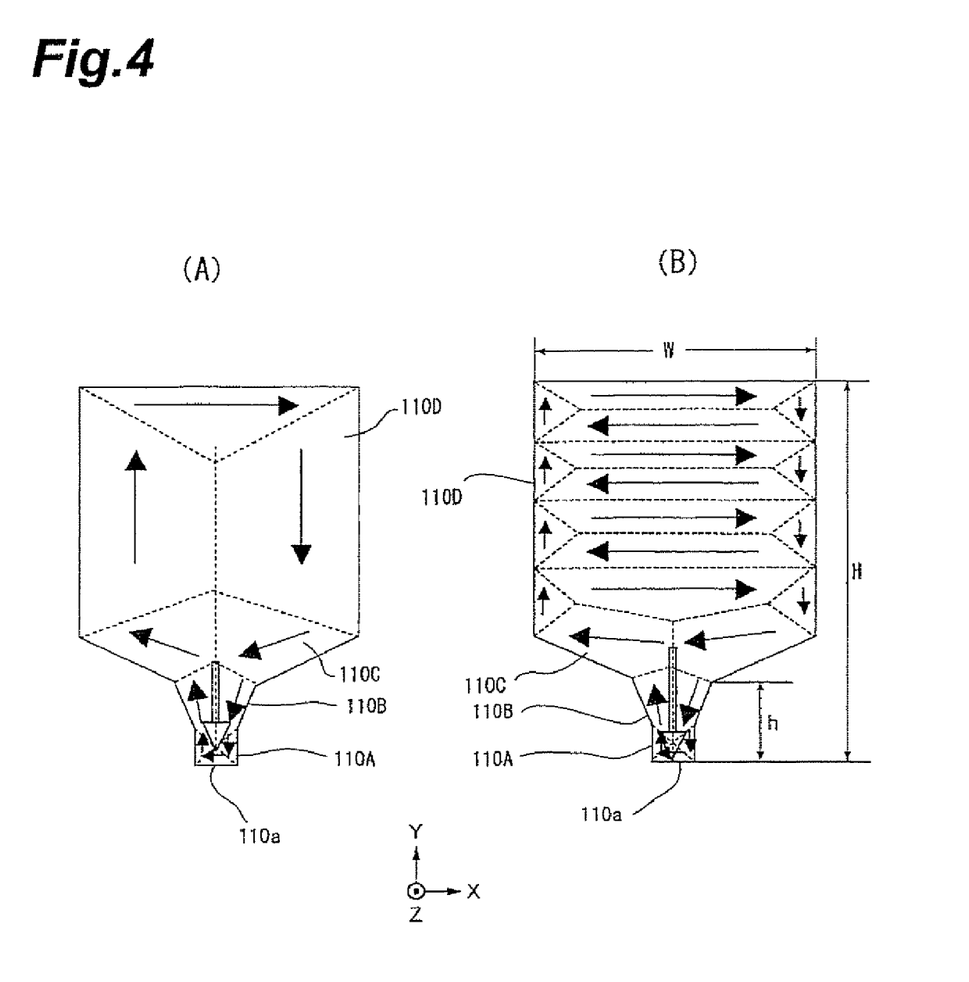

In the example shown in (A) of FIG. 4, a magnetization component having a domain longitudinally regulated in the base part 110D is laterally regulated along a domain defined by the form of the second flare part 110C, and thus laterally regulated magnetization component is narrowed by a domain of the first flare part 110B. The magnetization component narrowed by the domain of the first flare part 110B is longitudinally regulated in a longitudinal domain of the pole straight part 110A. Thus, even the longitudinal magnetization component of the base part 110D is regulated laterally by the lateral domain of the second flare part 110C in this embodiment, so that the effective magnetization component emitted from the main magnetic pole leading end 110a becomes smaller as indicated by the whitened arrow, whereby the PE is suppressed.

In the example shown in (B) of FIG. 4, on the other hand, the domain is regulated laterally in the base part 110D, so that the effective magnetization component emitted from the main magnetic pole leading end 110a becomes smaller as indicated by the whitened arrow, whereby the PE is suppressed.

As in the foregoing, regardless of the domain control in the base part 110D, the main magnetic pole layer 110 in this embodiment reduces the effective magnetization component emitted from the main magnetic pole leading end 110a, thereby suppressing the PE.

Conditions for making a laterally striped domain in the base part 110D as shown in (A) of FIG. 4 will now be explained.

Letting H be the length in the height direction of the main magnetic pole layer 110 and W be the width (in the track width direction) of the base part 110D, it is necessary for the length H and main width W to satisfy the following conditional expression (1):

$$H \leq W. \tag{1}$$

Preferably, $2 \times H \leq W.$

Even with such a form, the domain in the vicinity of the main magnetic pole leading end 110a is determined by the flare angle $\alpha 2$ of the second flare part 110C. Therefore, the second flare angle α2 of the second flare part 110C is set such as to satisfy the following conditional expression (2):

$$60° \leq \alpha 2. \quad (2)$$

When the conditional expression (2) is satisfied, the effective magnetization (whitened arrow) additionally applied to the main magnetic pole leading end 110a becomes the same ((A) and (B) of FIG. 4) whether the base part 110D has a closure domain structure ((A) of FIG. 4) or a laterally striped domain structure ((B) of FIG. 4).

Since the magnitude of magnetization in the main magnetic pole layer 110 is roughly determined by the product of the length h of the pole straight part 110A and the first flare part 110B, and the saturated magnetic flux density Bs, h×Bs, the length h of the pole straight part 110A and the first flare part 110B is limited such as to satisfy the following conditional expression (3):

$$h \times Bs < 0.000008 [m \cdot T]. \quad (3)$$

Satisfying the conditional expression (3) can reduce magnetic fields leaking from the magnetic pole leading end 110a.

The saturated magnetic flux density Bs is set to 2.1 to 2.3 T as in typical materials used for main magnetic pole layers of thin-film magnetic heads.

Figure 5:
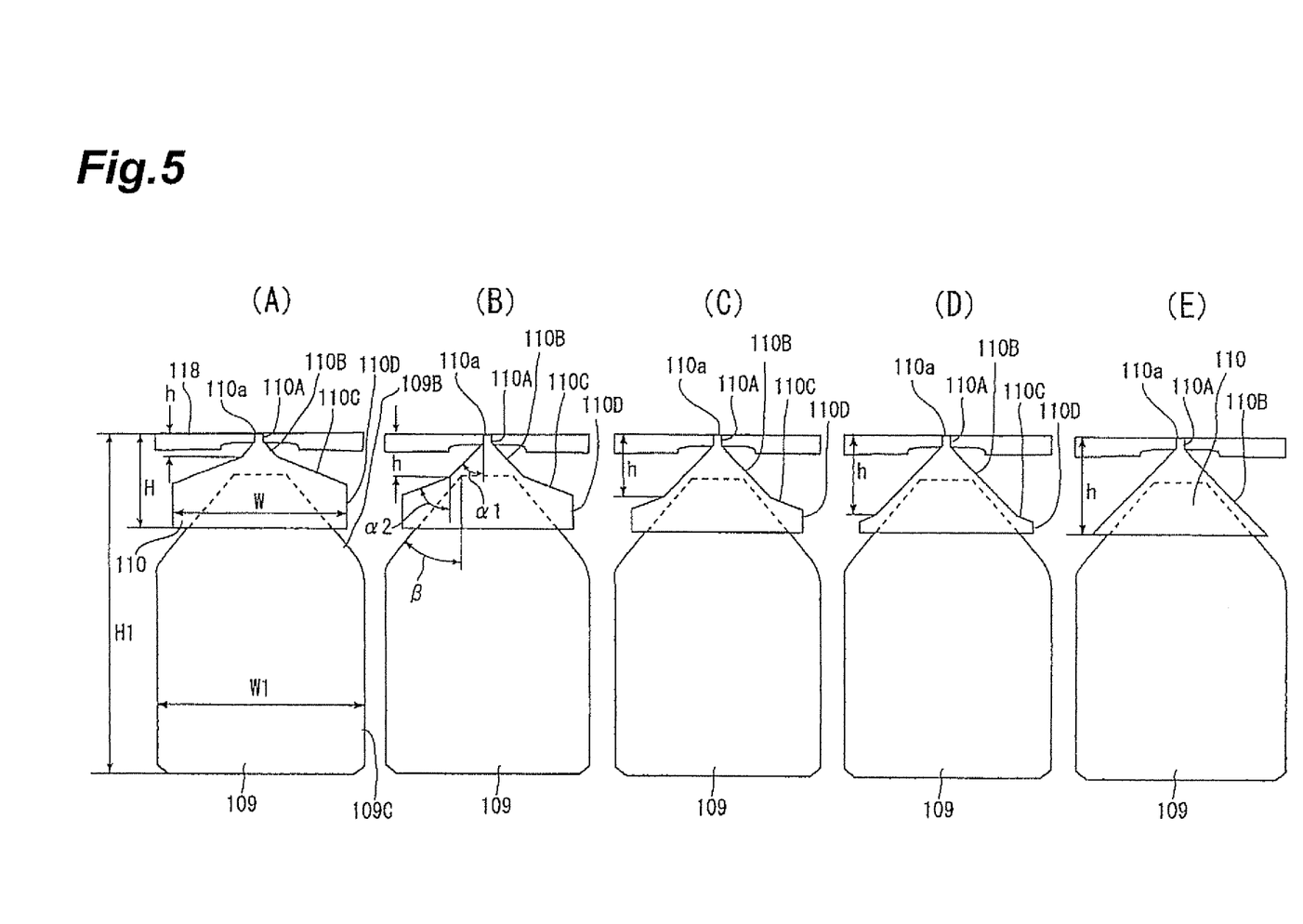
Figure 6:
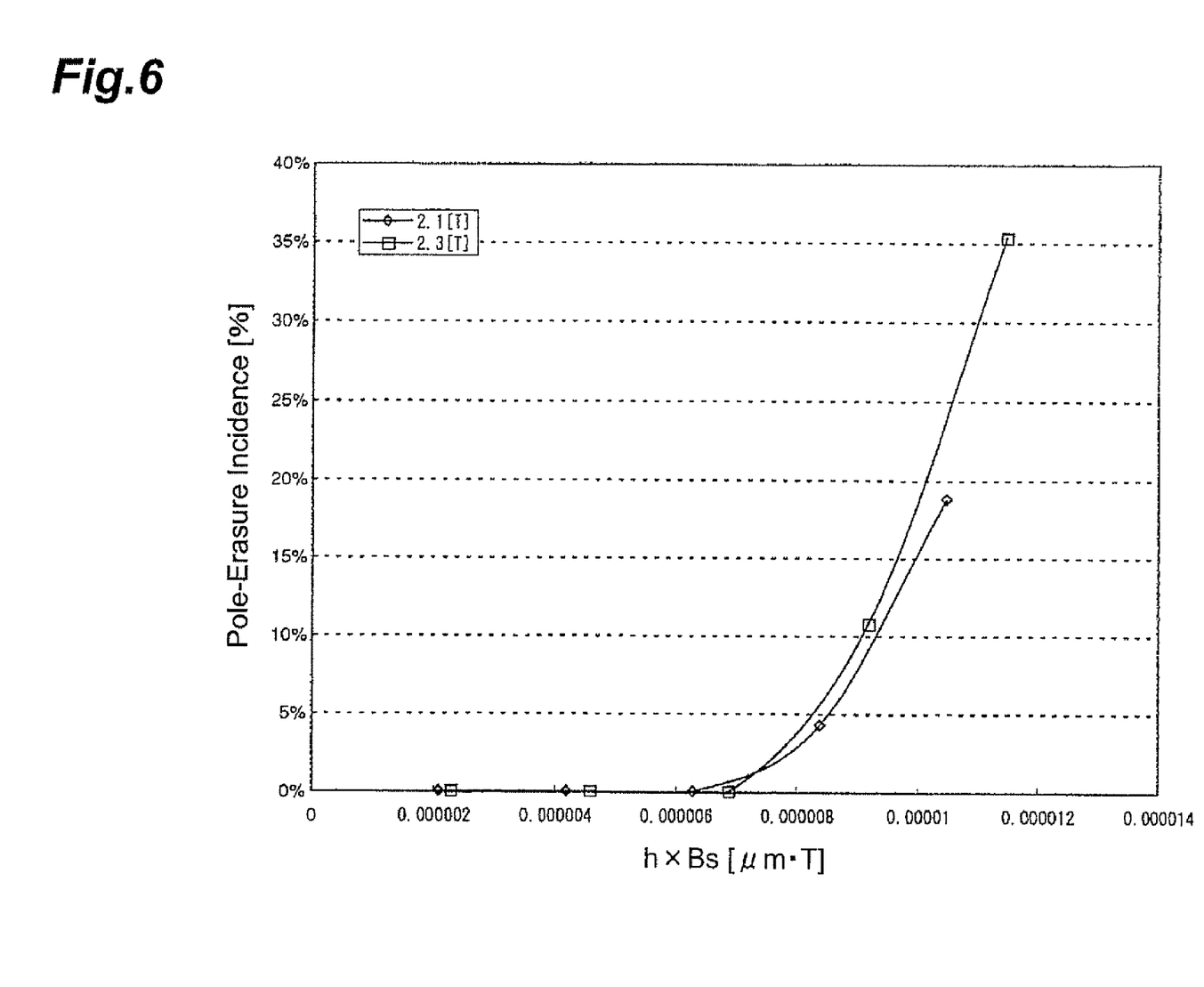
FIG. 6 is a graph showing the relationship between the incidence of PE and the product of the length of the first flare part and saturated magnetic flux density in the thin-film magnetic heads in which the saturated magnetic flux density Bs of the main magnetic pole layer was 2.1 T and 2.3 T; and (A) and (B) of FIG. 7 are views for explaining the problem concerning domains in the conventional main magnetic pole layer.

Results of investigating PE characteristics in examples of the thin-film magnetic head in accordance with the present invention satisfying the foregoing conditional expressions (1), (2), and (3) and comparative examples unsatisfying the conditional expression (3) will further be explained specifically with reference to FIGS. 5 and 6.

In the main magnetic pole layer 110, the length H in the height direction was set to 5 [μm], while the width W of the base part 110D was set to 10 [μm]. In the auxiliary yoke layer 109, the width W1 of the base part 109C was set to 14 [μm], the height H1 from the medium-opposing surface to the end on the deeper side in the height direction was set to 18.5 [μm], the first flare angle α1 and flare angle β were set to 40°, and the second flare angle α2 was set to 70°. They satisfy the conditional expressions (1) and (2).

Next, materials for the main magnetic pole layer 110 were chosen such that the saturated magnetic flux density Bs of the main magnetic pole layer 110 became 2.1 T or 2.3 T. Using these materials, a number of thin-film magnetic heads MH ((A), (B), (C), (D), and (E) of FIG. 5) in which the length h of the pole straight part 110A and the first flare part 110B was 1, 2, 3, 4, and 5 [μm] while setting the first flare angle α1 and flare angle β to 40° were manufactured. Those in which the length h of the pole straight part 110A and the first flare part is 1, 2, and 3 [μm] are examples of the present invention satisfying the conditional expression (3), whereas those in which the length h of the pole straight part 110A and the first flare part is 4 and 5 [μm] are comparative examples failing to satisfy the conditional expression (3).

Thus manufactured thin-film magnetic heads MH were subjected to PE tests, and ratios of signals remaining after the tests were measured. Table 1 and FIG. 6 show the results.

TABLE 1

| Bs [T] | h [μm] | h × Bs | Number of samples | Pole-Erasure Number of samples with PE determined | Incidence of PE |
|---|---|---|---|---|---|
| 2.1 | 1 | 0.0000021 | 205 | 0 | 0% |
| 2.1 | 2 | 0.0000042 | 210 | 0 | 0% |
| 2.1 | 3 | 0.0000063 | 202 | 0 | 0% |

TABLE 1-continued

| Bs [T] | h [μm] | h × Bs | Number of samples | Pole-Erasure Number of samples with PE determined | Incidence of PE |
|---|---|---|---|---|---|
| 2.1 | 4 | 0.0000084 | 213 | 9 | 4% |
| 2.1 | 5 | 0.0000105 | 213 | 40 | 19% |
| 2.3 | 1 | 0.0000023 | 215 | 0 | 0% |
| 2.3 | 2 | 0.0000046 | 206 | 0 | 0% |
| 2.3 | 3 | 0.0000069 | 205 | 0 | 0% |
| 2.3 | 4 | 0.0000092 | 205 | 22 | 11% |
| 2.3 | 5 | 0.0000115 | 204 | 72 | 35% |

FIG. 6 is a graph showing the relationship between the incidence of PE and the product of the length h of the pole straight part 110A and the first flare part 110B and saturated magnetic flux density Bs (h×Bs) in the thin-film magnetic heads MI in which the saturated magnetic flux density Bs of the main magnetic pole layer 110 was 2.1 T and 2.3 T. The ordinate and abscissa of the graph indicate the incidence of PE [%] and h×Bs [m·T], respectively.

The foregoing results of investigation show that no PE occurs in the examples of the present invention in which the length h of the pole straight part 110A and the first flare part 110B is 1, 2, and 3 [μm]. These examples satisfy the conditional expression (3). However, the PE is found to occur in comparative examples in which the length h of the pole straight part 110A the first flare part 110B is 4 and 5 [μm]. These comparative examples fail to satisfy the conditional expression (3).

It is apparent that various embodiments and modifications of the present invention can be embodied, based on the above description. Accordingly, it is possible to carry out the present invention in the other modes than the above best mode, within the following scope of claims and the scope of equivalents.

What is claimed is:

1. A thin-film magnetic head comprising:
    a main magnetic pole layer having a pole straight part exposed at a surface opposing a recording medium, a flare part widening in a track width direction from the pole straight part to a deeper side in a height direction, and a base part connecting with an end on the deeper side in the height direction of the flare part; and
    an auxiliary yoke layer having a flare part widening in the track width direction from the medium-opposing surface side to the deeper side in the height direction and a base part connecting with an end on the deeper side in the height direction of the flare part, the auxiliary yoke layer overlapping the main magnetic pole layer when seen two-dimensionally and magnetically connecting with the main magnetic pole layer;
    wherein the flare part of the main magnetic pole layer has at least first and second flare parts successively from the pole straight part to the deeper side in the height direction, the first and second flare parts having such a form as to narrow a magnetic flux stepwise from the base part to the pole straight part;
    wherein the first flare part has a first flare angle smaller than a second flare angle of the second flare part, the second flare angle being smaller than 90°, the auxiliary yoke layer having a flare angle not smaller than the first flare angle but not greater than the second flare angle, and the first flare angle, the second flare angle, and the flare angle measured relative to the height direction; and wherein the length h from the medium-opposing surface of the pole straight part to the end on the deeper side in the height direction of the first flare part satisfies the following conditional expression:

$$h \times Bs < 0.000008 \, [m \cdot T]$$

where Bs is the saturated magnetic flux density of the main magnetic pole layer.

2. The thin-film magnetic head according to claim 1, wherein the base part of the main magnetic pole layer has a substantially constant width measured in the track width direction.

* * * * *